Figure 1:
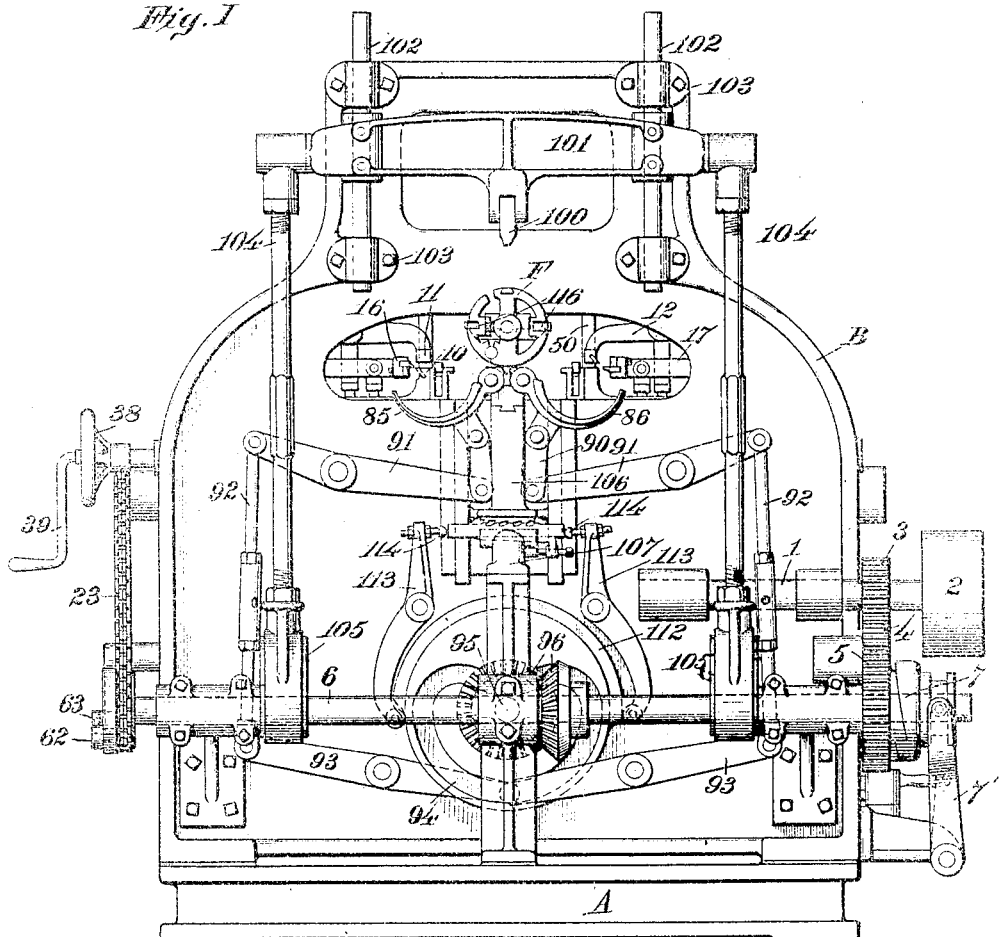

V. ODQUIST & H. H. LYCHE.
LOCK SEAMER.
APPLICATION FILED OCT. 20, 1906.

926,592.

Patented June 29, 1909.
10 SHEETS—SHEET 1.

Witnesses:

Inventors:
Victor Odquist
and Halvor H. Lyche

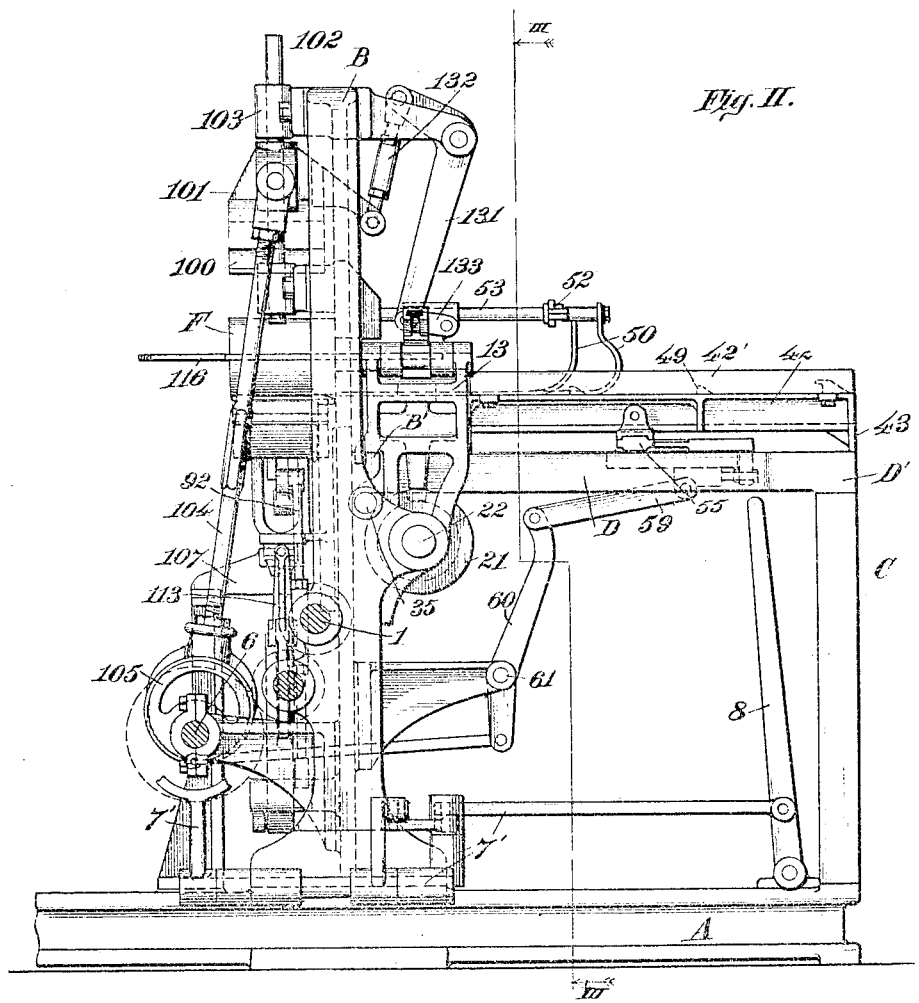

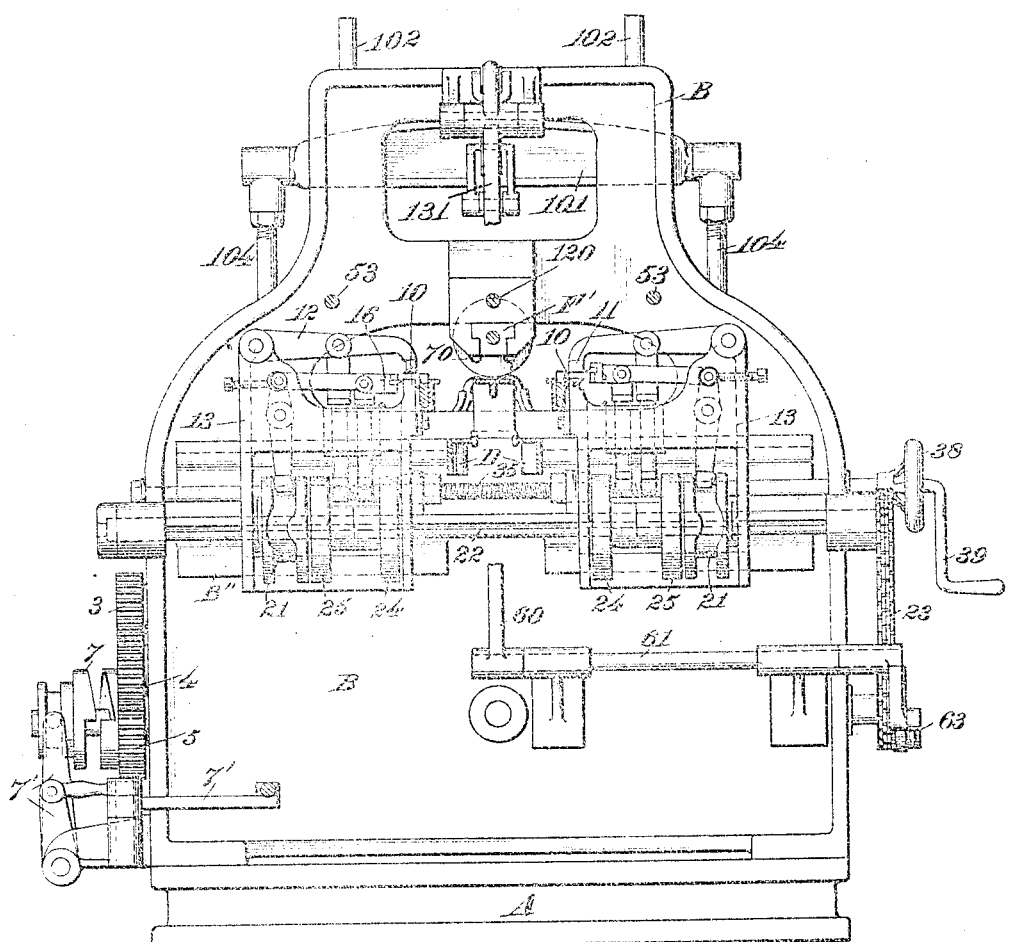
Fig. III.

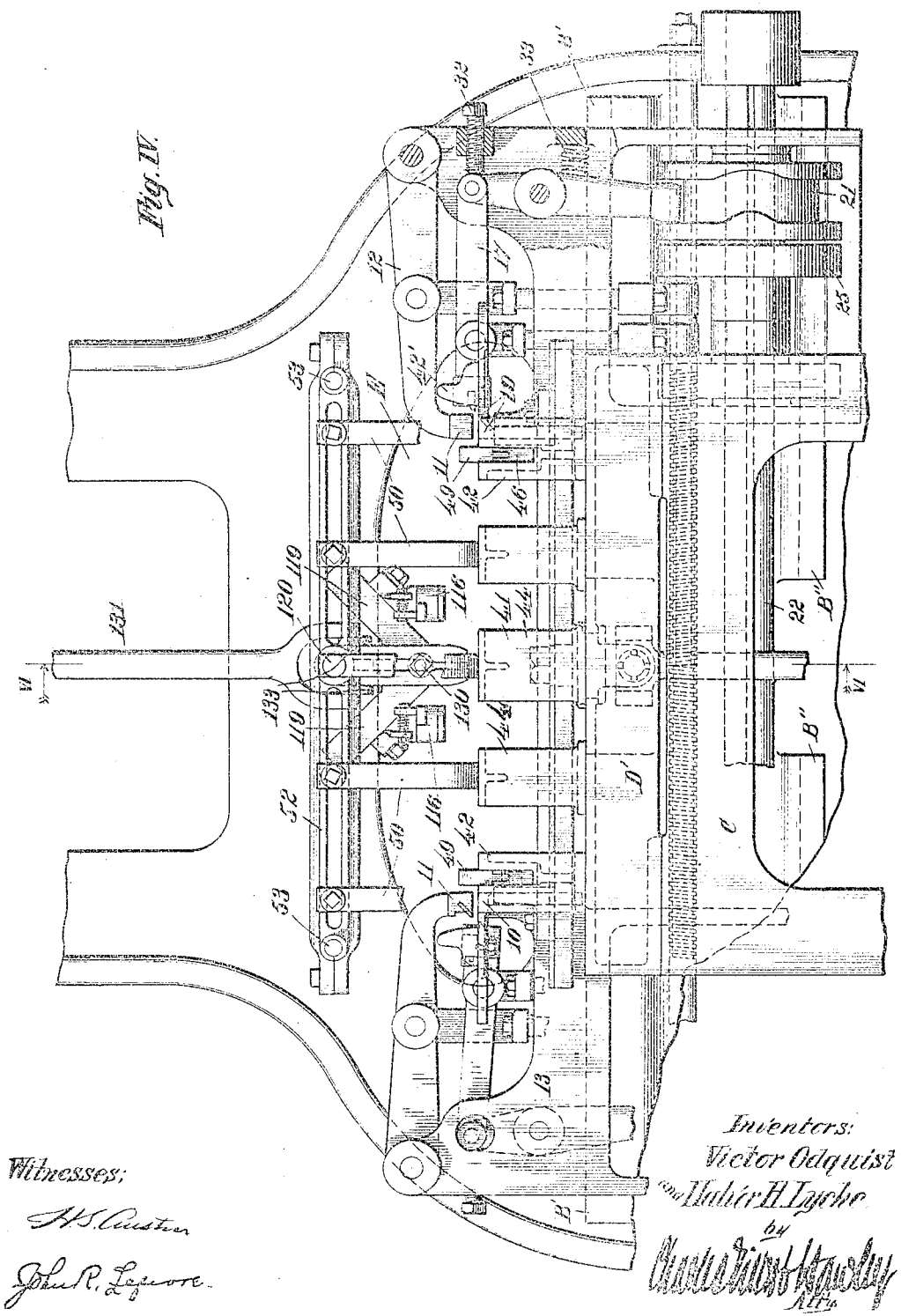

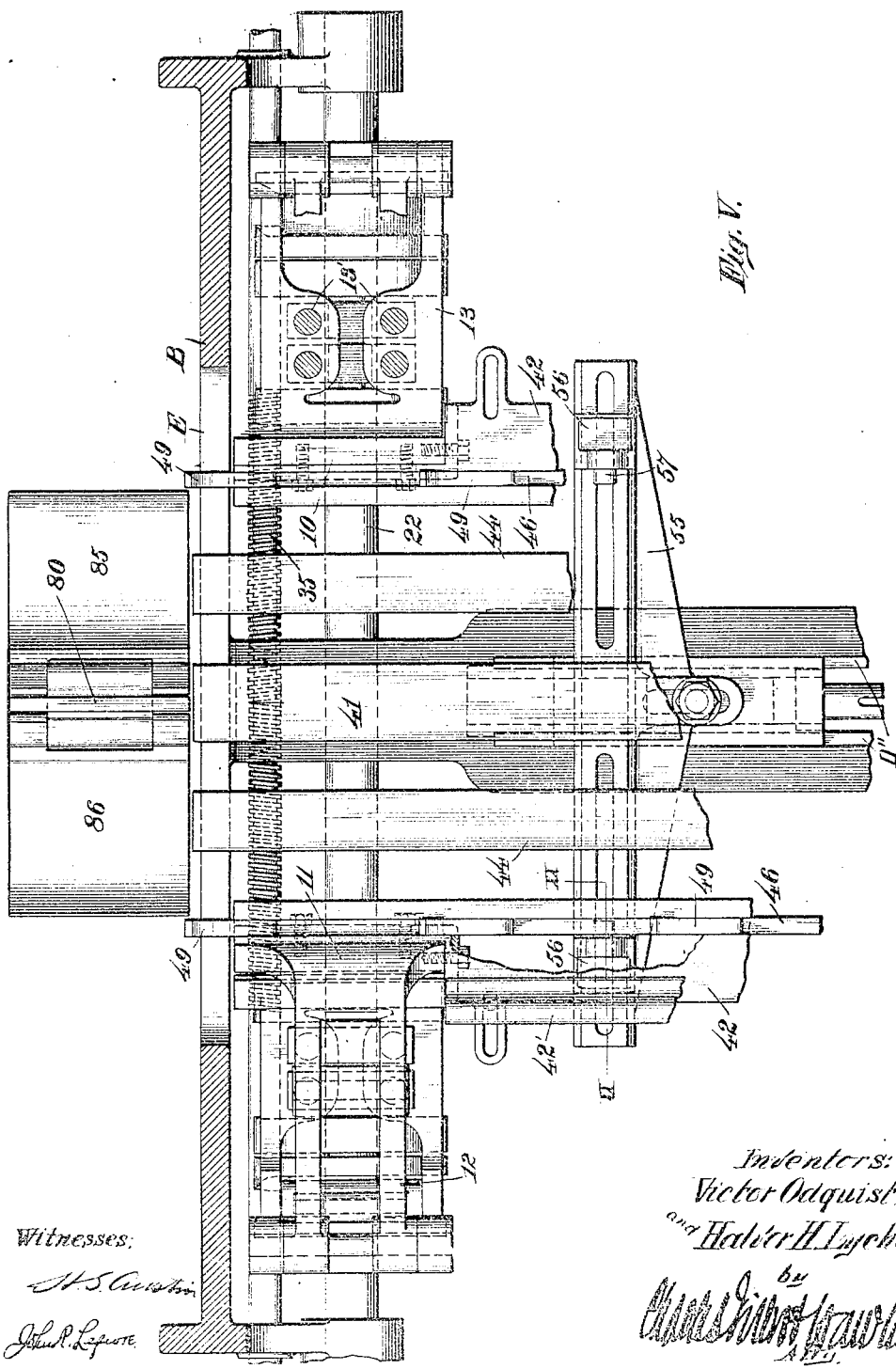

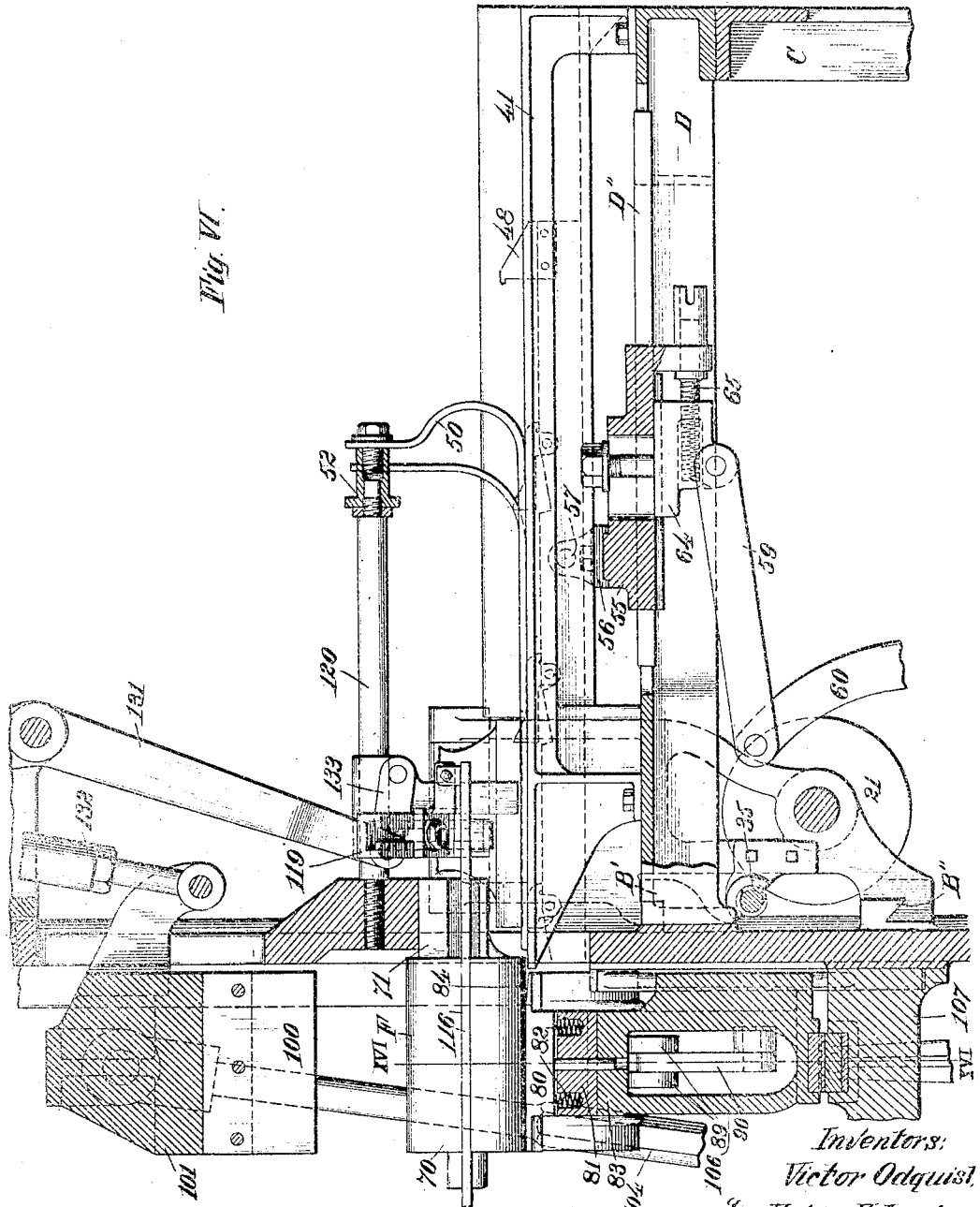

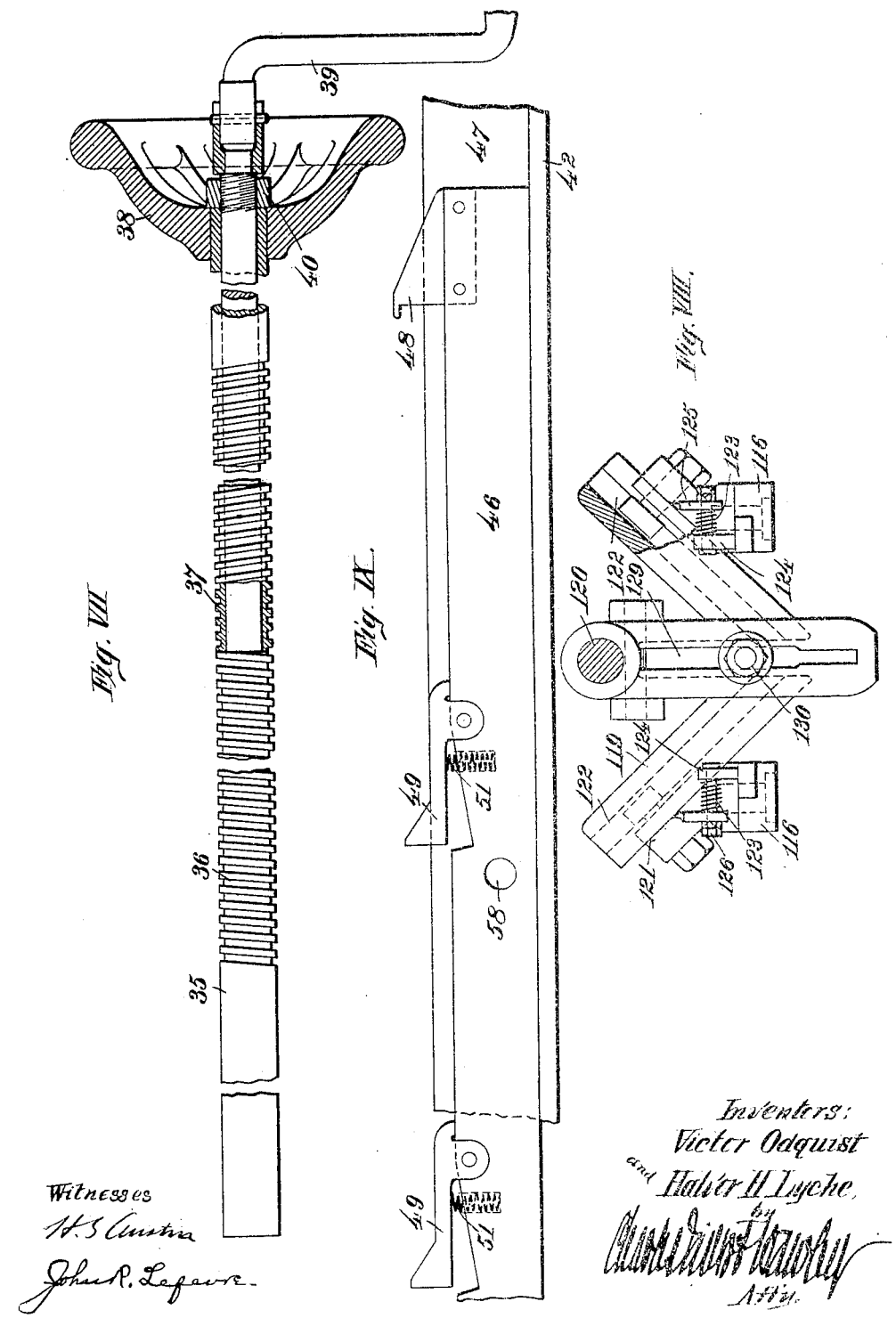

V. ODQUIST & H. H. LYCHE.
LOCK SEAMER.
APPLICATION FILED OCT. 20, 1906.
No. 926,592.
Patented June 29, 1909.
10 SHEETS—SHEET 8.
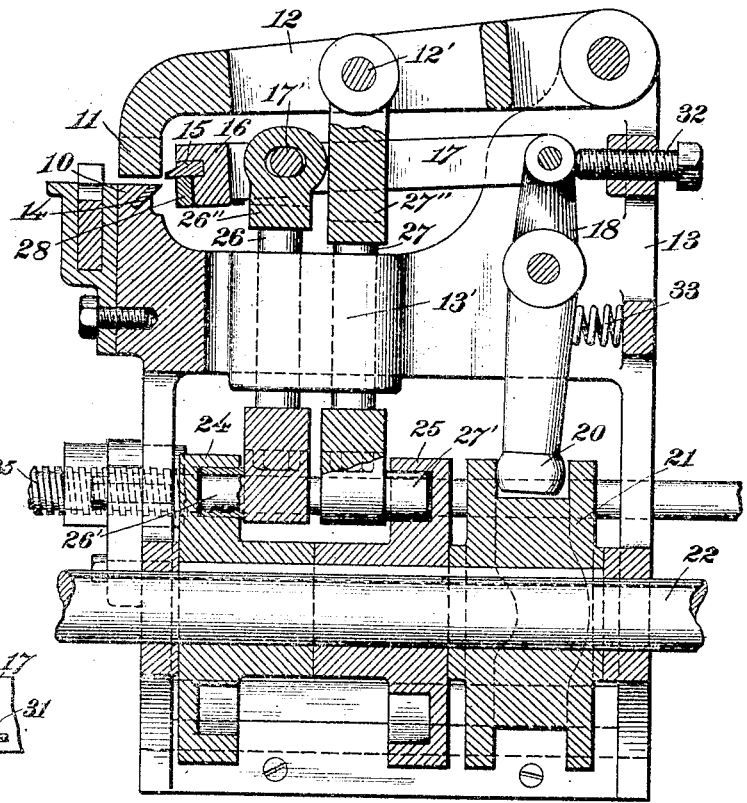
Fig. X.
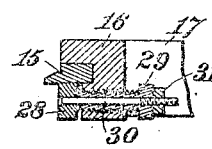
Fig. XI.
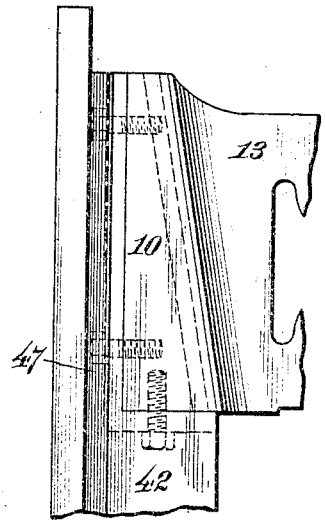
Fig. XII.
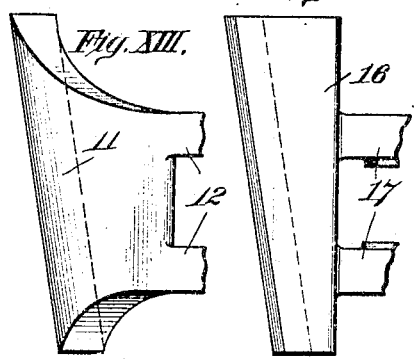
Fig. XIII.
Fig. XIV.
Witnesses:
H. S. Austin
John R. Lefeore
Inventors:
Victor Odquist
and Halvor H. Lyche
by
Charles Thibos Hardy
Atty.

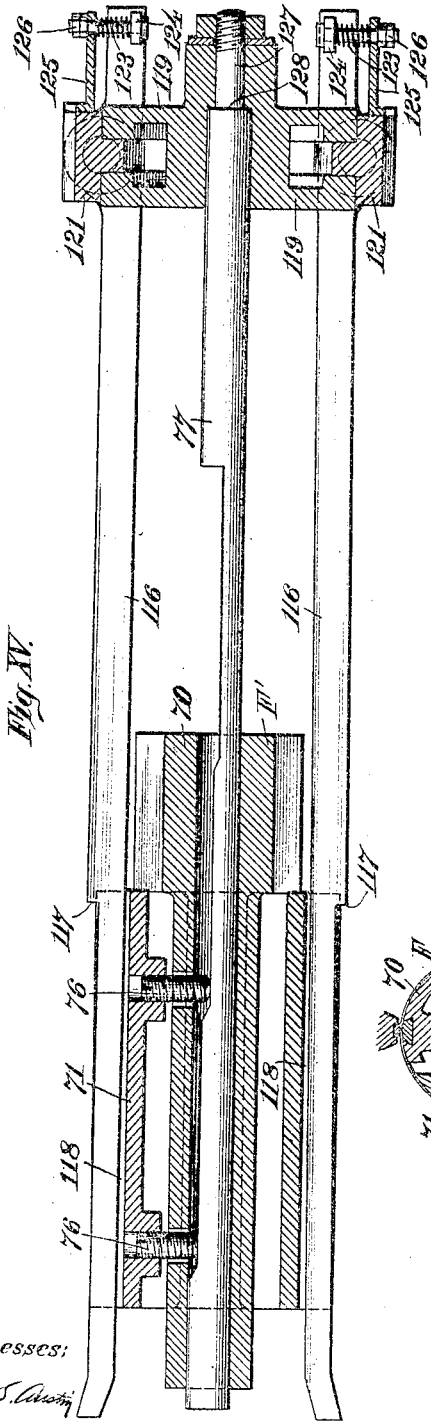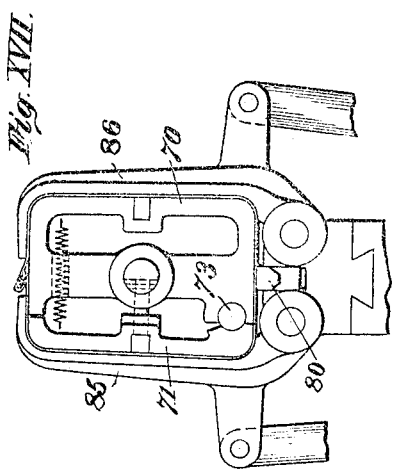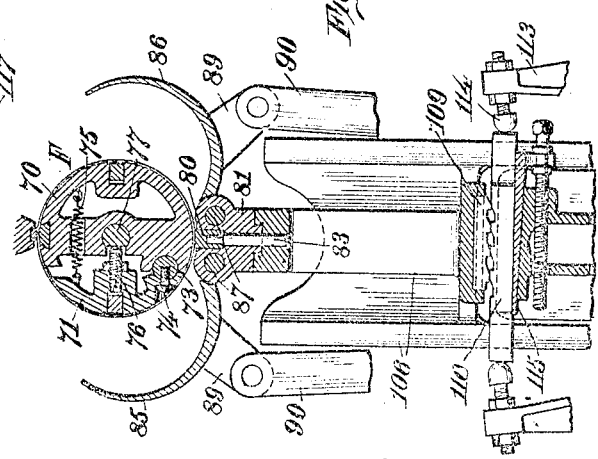

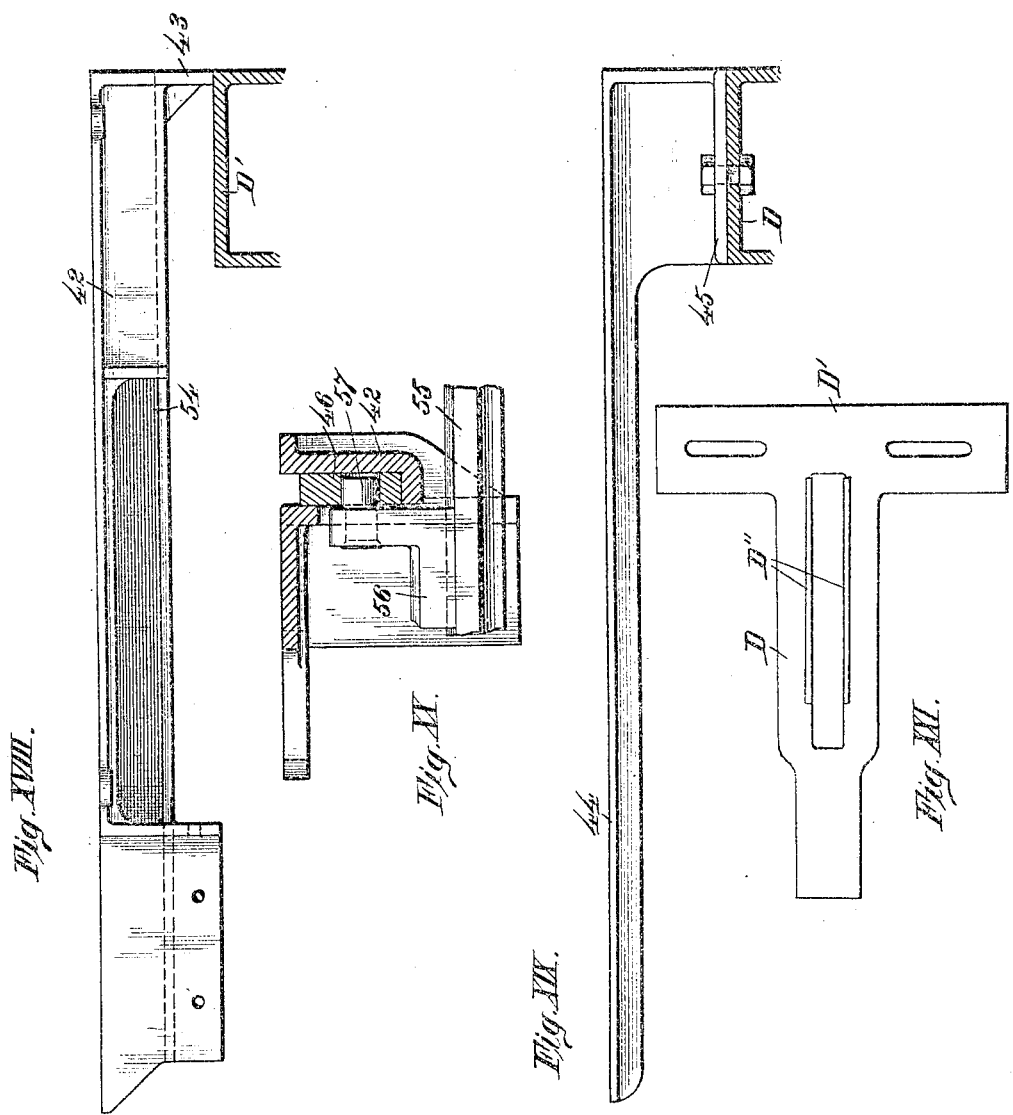

UNITED STATES PATENT OFFICE.

VICTOR ODQUIST AND HALVOR HEYERDAHL LYCHE, OF CHICAGO, ILLINOIS; SAID ODQUIST ASSIGNOR TO TORRIS WOLD & COMPANY, OF CHICAGO, ILLINOIS, A CORPORATION OF ILLINOIS.

LOCK-SEAMER.

No. 926,592.  Specification of Letters Patent.  Patented June 29, 1909.

Application filed October 20, 1906. Serial No. 339,739.

*To all whom it may concern:*

Be it known that we, VICTOR ODQUIST and HALVOR HEYERDAHL LYCHE, citizens of the United States, and both residents of Chicago, county of Cook, and State of Illinois, have invented a certain new, useful, and Improved Lock-Seamer, of which the following is a full, clear, and exact description, such as will enable others skilled in the art to which it appertains to make and use the same.

Our invention relates to can making machines and has special reference to those machines employed for making the bodies of cans, tin pails, and the like.

More specifically our invention relates to that class of can body making machines known as lock-seamers wherein edges of the blanks are bent into the desired predetermined shapes and joined. There are machines now on the market which are equipped with all the devices necessary to make such can bodies, but so far as we are aware, such machines are large and cumbersome, are complicated in their structure, and are limited in their production. Consequently in a factory properly equipped to turn out cans of all shapes and sizes, an excessive amount of floor space is necessary, both for the individual machines and for the number of machines required to produce the cans of various styles.

The object of our invention is to provide a simple, compact and durable machine for rapidly and accurately making the bodies of locked seamed cans or other sheet metal ware, which machine shall occupy a minimum of floor space and shall be of such simple construction as to materially lessen the liability to accidents and also the cost of repairs.

A further object of our invention is to provide a machine of small size, but of large capacity; and further to provide a machine of the class mentioned which will be capable of making can bodies or the like, from the smallest size to those of large dimensions, and a still further object is to provide a machine which, with a minimum expenditure of time and labor, may be adjusted to form can bodies of any shape or size.

A further object of our invention is to provide a machine of the class mentioned of minimum height as compared with similar machines, and in which practically all of the rotating and operating parts are located at the lower part of the machine, or below the feed table, to the end that they may be more readily accessible, and to give greater stability to the machine.

A further object of our invention is to provide a machine capable of quick adjustment to form can bodies of various sizes or shapes, but which when once set will operate with extreme accuracy for indefinite periods.

Another object is to provide a machine of the class mentioned, which shall have comparatively few parts, and in which the various parts shall be driven practically from the main drive shaft with few interposed parts or lost motions, to the end that the machine will work with great accuracy.

A still further object of our invention is to provide a machine of the class mentioned which shall be under the direct control of the operator in order that it may be readily and quickly started or stopped when desired.

With these objects in view, our invention consists in the machine and such combinations of its parts, as is hereinafter described and particularly pointed out in the claims.

Our invention will be more readily understood by reference to the accompanying drawings, and in which—

Figure I, is a front elevation of a machine embodying our invention; Fig. II, is a side elevation thereof, the clutch and a portion of the gearing being omitted for the sake of clearness. Fig. III, is a vertical section on the line III—III of Fig. II; Fig. IV, is a rear elevation on an enlarged scale, of a portion of the machine particularly illustrating the adjustability of the table, edgers and correlated parts; Fig. V, is a plan view of the subject matter of Fig. IV, parts being broken away for sake of clearness; Fig. VI, is a vertical longitudinal section on the line VI—VI of Fig. IV; Fig. VII, is a detail view on an enlarged scale of the edger adjusting screw; Fig. VIII, is a detail of the slide which carries the ejector and horn expander, illustrating the adjustability of the expander and ejectors for horns of various sizes; Fig. IX, is an enlarged detail view of a portion of the blank feed; Fig. X, is a vertical sectional view through one of the edgers; Fig. XI is a detail view illustrating the gage adjustment; Figs. XII, XIII, and XIV are details of the jaws and folders of the edgers as used in making taper bodied cans; Fig. XV, is a horizontal section through the horn showing the expander and ejectors; Fig. XVI is a vertical section on the line XVI—XVI of Fig. VI; Fig. XVII is a detail view illustrating the horns and folders such as are used in making square cans; Fig. XVIII is a side view of one of the outside table-members; Fig. XIX is a similar view of one of the extra table members such as is used when making cans of large size; Fig. XX is a detail section on line X—X of Fig. V; and Fig. XXI is a plan view of the horizontal member of the frame.

In order that our invention may be more readily understood, we will give a brief description of the machine as a whole, before describing the same in detail, but not aiming therein to point out particularly the special advantages and particular features thereof, but merely to state the principal parts and their general operation.

For the sake of greater clearness the frame and other stationary parts will be designated by letters while the movable or moving parts will be characterized by numerals.

The frame of the machine rests upon a bed plate A and comprises a front upright member B, a rear member or legs C, and a horizontal member D, uniting the members B and C into a rigid structure. Suitable edgers are mounted in ways upon the rear face of the member B. These edgers form the hooks on the edges of the blanks preparatory to forming the lock seam and are adjustable toward or away from each other to accommodate blanks of various sizes. A table, adjustable in width, rests partially upon the member D, and partially upon the frames of the edgers; that is the forward ends of the outside table members are rigidly attached to the edgers, so that as the edgers are adjusted to the size of the work to be done, the table is likewise adjusted. The blanks are fed by hand, or otherwise, to the table, where a suitable device feeds them forward, successively and intermittently to the edgers. After the edges of the blank are properly turned, the blanks are fed on to a position directly beneath a horn or form upon which the can body is to be shaped. A spring clamp holds the blanks in position, until an anvil rises and holds the same securely, when a pair of wings of substantially the same shape and size as the horn, fold the blank about said horn. The wings are so timed that one operates somewhat in advance of the other so that the outwardly bent edge will be first placed upon the horn, and afterward the inwardly bent one placed above it and interlocked therewith. While the blank is being bent about the horn, the horn is contracted in diameter to permit the hooked edges to pass each other, after which it is expanded, drawing the hooks into tightly interlocked position. The wings, then recede, and a hammer descends upon the seam, pressing the same into a tight, secure joint. While the anvil serves to hold the blank securely while being bent about the horn, its primary object is to support the horn during the hammering to prevent undue strain thereon. As the hammer rises the anvil recedes and a push-off device shoves the lock seamed body off of the horn preparatory to its receiving another.

Our invention will now be described in detail by taking up in order, the frame and drive mechanism, the edgers, the table, the horn and wings, the hammer and the anvil, and lastly of the machine as a whole, describing the general arrangement of the parts in relation to each other.

*The frame and drive mechanism.*—As before stated, the frame of our machine comprises a bed plate A, a front member B, a rear member C, and a horizontal member D. The member B is the main portion of the frame and carries practically all of the mechanisms, with the exception of the adjustable table and the blank feed mechanism which is carried mostly by the member D. The member D at its forward end abuts the member B and is bolted thereto; and its rear end rests upon the leg member or support C. It is in the form of a letter T, the foot resting against the front member and the cross part D' resting upon the legs C. Being narrow at its forward end, it permits the edgers, which are located one on each side thereof, to be drawn quite close together when making cans of small diameter. The rear end of the member D is broad as shown in Fig. IV to receive and support the rear end of the adjustable table and will be more fully described in conjunction therewith. The drive mechanism consists in a short pulley shaft bracketed upon the frame member B, and an auxiliary shaft connected thereto through suitable gearing and clutch mechanism. 1 indicates the pulley shaft and 2 the pulley thereon. The shaft 1 also carries a pinion 3 which is geared through idle pinion 4 to a gear 5, loosely mounted upon the auxiliary shaft 6. The shaft 6 which is journaled near the base of the machine, extends across the face of the member B, and it is from it that the movements of the various parts of the machine are derived. A clutch 7 couples the gear 5 to the shaft 6 and is operated through suitable mechanism 7' by a lever 8. It will be seen that the pulley shaft and gearing run continuously, and that the machine is started or stopped by merely throwing the lever 8.

*The edgers.*—As before stated, the edgers are mounted on ways upon the frame member B, and are located, one on each side of the member D. Each edger comprises a pair of jaws, constituting a clamp, which holds the ends of the blank while the edge is being turned, a pair of edge turning membars, one fixed upon one member of the clamp and the other fixed upon a vertically swinging and horizontally reciprocating member, and a plurality of cams to operate said members, the whole being arranged in a suitable frame, permitting it to be moved as a unit transversely of the machine. By arranging the edgers so that they and their operating mechanisms move together, a constant relation between them is maintained at all times, which obviates the necessity of readjusting the connections between them when the position of the edgers is changed.

10 indicates the stationary jaw of the clamp which is formed upon the frame of the edger, and 11 the movable member thereof. These jaws are of a width coextensive with the width of the largest blanks to be used upon the machine. The upper or movable jaw 11 is formed at the end of a lever 12, pivoted in the edger frame 13.

The edge turning members are a pair of hardened steel strips, of a width equal to that of the jaws. One of said members is secured to one of the jaw members 10 or 11. That is, on one side of the machine the edge turning strip is located on the lower or stationary jaw 10, whereas on the opposite side of the machine, it is located on the upper or movable jaw 11. This is done for the reason that one edge of the blank must be turned upwardly while the other edge must be turned downwardly, in order to properly interlock when bent about the horn. With the exception as to the reverse location of the edge turning members, as just described, the edgers are of practically the same construction, and, keeping in view the fact that one is right hand and the other left, a description of one will answer for both. Inasmuch as the edge turning member which is located in the jaws is stationary during the edge turning operation, whether located in the upper or lower jaw, it will be spoken of hereinafter as the stationary member, in contradistinction to the coacting member which has both vertical and horizontal movements and which will be spoken of as the movable member.

14 indicates the stationary edge turning member and 15 the movable member. The latter is located in a head, 16, formed upon the end of a lever 17. To permit horizontal reciprocation of the lever 17, as well as vertical movement, it is pivoted to the upper end of a lever 18 mounted in the frame 13. The lower end of the lever 18 is provided with a roller 20, which engages a cam 21 feathered on a shaft 22. The shaft 22 extends across the rear face of the casting B, passing through the frames of both edgers, and is driven from the shaft 6 by sprocket gearing 23. Vertical reciprocation is imparted to the levers 12 and 17 at the proper time by cams 24, 25, also feathered on the shaft 22. The cams 21, 24, and 25, are held between the ends of the edger frames, and being feathered on the shaft 22, are movable with said edgers. The levers 12 and 17 are connected to their respective cams through pitmen 26 and 27. Each pitman consists of a pair of rods mounted in guides, 13', formed upon the frame 13, and suitable connecting members at both their upper and lower ends. The lower connecting members carry cam engaging rollers 26', 27', and the upper connecting members 26'', 27'' are pivoted to their respective levers, by pins 12', 17'. To permit the proper horizontal movement of the lever 17, the member 26'' is slotted as shown in Fig. X to receive the pin 17'. Fig. X illustrates the right hand edger, and the parts are so arranged as to form the under bent hook on the blank.

The blank is fed in between the jaws 10 and 11 and projects slightly beyond the edge of the member 14 and under the member 15. The cam 25 then operates to close the jaws 10 and 11, clamping the blank firmly between them. Cam 24 then depresses the lever 17, thereby bending the edge of the blank downwardly, after which the cam 21, rocks the lever 18, moving the lever 17 toward the jaws 10 and 11. This double movement of the lever 17 bends the edge of the blank about the member 14, forming a hook. The left hand edger operates in the same manner except that the lever 17 moves upwardly and inwardly, forming the hook about the member 14, which is attached to the jaw member 11. In order that the blank shall project to just sufficient distance beyond the member 14 to form a hook of the proper size, a gage is provided upon the head of the lever 17. This comprises a bar 28 arranged in juxtaposition to the member 15, and means for adjusting it in relation thereto. The means for adjusting the gage is as follows: A screw 29 is tapped through each end of the head 16, and impinges against the bar 28. A small screw threaded rod 30 is riveted to the bar 28 and extends through a bore in the screw 29, and a nut 31 locks the whole in position when once properly set. To adjust the gage, the nut 31 is loosened and the screw 29 turned until the bar is in proper position, then the nut 31 is tightened.

To properly adjust the edging member 15, in relation to the member 14, a screw 32 is tapped through the frame 13, and impinges against the end of the lever 18. As the adjustment necessary is small, and the groove in the cam 21 is wider than the roller 20, by turning the screw 32, the required amount of movement may be imparted to the levers 17 and 18 to make the proper adjustment. A spring 33 keeps the lever retracted against the screw 32, except at such times as it is actuated by the cam 21.

It will be noted that each edger, including its operating cams, is a compact structure and is self-contained and that the whole device may be shifted laterally without disturbing the relations of any of its parts. To permit lateral adjustment of the edgers, they are mounted on ways B', B'', provided for them on the rear face of the frame member B. To adjust the edgers toward or from each other, to accommodate blanks of smaller or larger size, a hand operated screw device is used. Generally speaking it is a rod extending across the machine having both right and left hand threaded portions, each said portion being engaged by one of the edgers. It is evident that by turning the rod, which is journaled on the member B, the edgers may be moved toward or away from each other. While it is usual to move both edgers simultaneously and to the same degree, it is sometimes desirable to move one edger without moving the other, or one a greater distance than the other. Therefore the rod is so constructed that the right hand and left hand threaded portions may be moved either together or independently. This construction is illustrated in detail in Fig. VII.

35 indicates the rod. Throughout one half of its length it retains its full diameter and is threaded as shown at 36. The remainder of the rod is turned down to accommodate a sleeve 37, which is furnished with threads on the opposite hand from the screw 36. The sleeve is furnished with a hand wheel 38, and the rod 35 is provided with a crank 39. It will be seen that by means of the wheel 38 or crank 39, either part of the screw may be operated independently of the other to move its respective edger. A nut 40 serves to bind the rod and sleeve together, when it is desired to move them simultaneously, and both may then be operated by either the wheel 38 or crank 39.

The edger as described, is one such as is used in making straight can bodies. For making tapered can bodies the only variation necessary is in the jaws and folders. These instead of being straight, are formed at an angle as shown in Figs. XII, XIII, and XIV.

*The table and feed mechanism.*—The table comprises a plurality of narrow members arranged above the frame member D, and at such a height that the plane of their tops is on a level with the face of the lower or stationary jaws 10 of the edgers, and also at a sufficient distance above the member D to leave an unobstructed space between them for a purpose which will appear hereinafter. These members extend longitudinally of the machine, their rear ends resting upon the broad portion D' of the member D and their forward ends extending a short distance through an opening E in the front frame member B.

In making can bodies of the smallest size and up to the medium size, but three such members are used; but in making can bodies of large size five members are used to properly support the blanks as they are fed through the machine. The central member 41 is a plain strip having a foot at each end which feet rest upon and are secured to the member D. Its structure and location are best seen in Figs. IV, V, and VI of the drawings. The outside members 42 are provided at their rear ends with a narrow foot 43 which rests upon the cross portion D' of the member D, and at their forward ends are rigidly secured to and supported by the frames of the edgers. Consequently, as the edgers are adjusted toward or away from each other the width of the table is also varied to a like degree. These members also carry a portion of the feed mechanism and adjustable guide strips which will be fully described hereinafter. Fig. XIX illustrates the table members which are used only when making cans of large diameter. These are bolted to the part D' intermediate of the members 41 and 42. Each said member consists of an inflexible strip 44, provided with a foot 45 of sufficient breadth to give rigidity to the strip, when bolted to the frame.

The blanks are fed one at a time to the table, and are then automatically and intermittently fed forward through the machine by a reciprocating feed mechanism. This mechanism comprises, primarily, a pair of bars slidably mounted in grooves provided for them in the table members 42, and carrying a plurality of dogs which extend a short distance above the plane of the table; a cross head mounted upon ways on the member D, adjustable connections between the cross head and the slidable bars, means for automatically reciprocating the cross head, and means for adjusting the feed bars in relation to the edgers and horn.

46, 46 indicate the bars, and 47, 47 the containing grooves in the members 42. Each bar 46 carries a fixed push member 48 at its rear end and a plurality of spring pressed dogs 49 located at equal distances throughout its length. When the machine is in operation blanks are fed upon the table in front of the members 48, which advance them to a position to be taken up by the first pair of dogs 49 on the next reciprocation of the bars 46. These advance them to a position to be taken up by the next pair of dogs and so on through the machine until the edged blank is delivered to the horn and folders. A plurality of springs 50 prevent the blanks from being drawn backward by the dogs 49 in their reverse travel, and the dogs are so constructed as to be readily depressed beneath the level of the table as they pass underneath the spring held blanks. As soon as the dogs pass from beneath the blanks, springs 51 return them to operative position. The springs 50 are adjustably secured to a cross member 52, supported upon rods 53, extending rearwardly from the frame member B. After the table members are properly adjusted the springs 50 are adjusted so that one presses upon each of said table members.

The bars 46 are reciprocated by means of the following mechanism. A cross head 55 is mounted in ways D'' upon the member D and occupies the aforementioned space between said member and the table. This cross head is of considerable width and carries a pair of blocks 56 adjustably secured thereto. The blocks 56 are located adjacent to the bars 46 and carry pins 57, which engage holes 58 in said bars, the members 42, being cut away on one side as at 54 for this purpose. A link 59 and arm 60, connect said cross head to a rock shaft 61, bracketed upon the frame B, and oscillated from the shaft 6 through a suitable crank 62 and pitman 63.

Inasmuch as blanks of different lengths are to be used in the machine, it is necessary to provide means for adjusting the dog carrying bars so that the blanks will be properly positioned at the end of each stroke of the cross head. To this end the connection between the arm 60 and the cross head is made adjustable.

64 indicates a block adjustably secured to the cross head. It is to this block the link 59 is attached. A screw device 65 is provided to regulate the position of the block 64 on the cross head. By turning the screw, the position of the dogs in relation to the edgers and folders is easily regulated. Bars 42', adjustably secured to the table members 42, guide the blanks on their passage along the table to the edgers, and insure their proper entry between the jaws 10 and 11, and the gages 28. The blanks, having been fed forwardly on the table to the edgers and properly edged, are then fed on by the last pair of dogs 49, to the body forming mechanism.

*The horn and folding wings.*—The body forming mechanism comprises an expansible horn, a pair of wings for bending a previously edged blank about said horn, means for contracting and expanding said horn to interlock the edges of the blank, a hammer for compressing the interlocked edges, an anvil for supporting the horn during the hammering to relieve said horn from undue strain, and a push-off mechanism for ejecting the can body from the horn. These parts are made adjustable or interchangeable with similar parts of different sizes and shapes, in order to form can bodies of various kinds and sizes.

The horn is located on the front of the frame B, just beyond the forward end of the table, and slightly above the plane thereof. As the edged blank is fed from the table to a position beneath the horn it is received upon a spring pressed member which is tightly pressed against the bottom of the horn until the anvil rises and securely clamps it in position. This prevents the blank from being accidentally turned previous to being bent about the horn, thus insuring a perfectly shaped can body. The spring pressed member is located in the top of a vertically reciprocating part which is designated as the anvil, inasmuch as it supports the horn during the hammering, as will be described hereinafter. The anvil also carries the wings which fold the "edged" blank about the horn. It is necessary for the horn to completely fill the can body during the forming, in order to insure uniformity of shape, consequently the horn must be made to contract at the proper time to allow the hooked edges to pass each other and then expand to interlock them, and to properly shape the can body. It is obvious that different horns and folding wings must be used for each size or shape of can, and to this end the horn and wings are so constructed and arranged as to be readily removed and one of the required shape and size substituted. In Figs. XV, XVI, and XVII these portions of the machine are shown in detail, and also in other figures, especially Fig. VI.

F designates the horn, provided with a shank F', by which it is detachably secured upon the frame B as clearly shown in Figs. III and VI. To permit expansion and contraction of the horn it is made in two parts, a stationary one 70, upon which the shank F' is formed, and a movable part 71. The stationary part 70 constitutes the bulk of the horn and is made heavy to stand the strain to which it is subjected in hammering. The movable part 71 comprises one side of the horn, hinged at or near the bottom to the stationary portion 70 by a pin 73, let into the latter. The pin 73 is let into the part 70 beyond its center and is in this way retained therein throughout its length, and the movable portion of the horn is secured to the pin by screws 74. Springs 75 keep the horn normally closed or contracted. Screws 76 are tapped through the part 71 and impinge against a tapered rod 77, which is longitudinally movable through the central portion of the stationary part 70. It is obvious that as the rod 77 moves forwardly, the horn is allowed to contract, but as the rod moves in the opposite direction the horn is expanded against the tension of the springs 75. See Figs. XV and XVI.

The spring pressed member, which clamps the blank against the bottom of the horn is indicated at 80. It is held in a groove formed in the top of a block 81, and is pressed upwardly by a pair of springs 82. A stem 83 entering a hole in the block 81 prevents the member 80 from being displaced. The end of the member 80 adjacent to the table is beveled, as at 84, to facilitate the entrance of the blank between the same and the horn. The block 81 constitutes the upper portion of the anvil, and to it the folding wings are hinged.

85, 86 indicate the wings, hinged at 87 to the block 81. Each wing is provided with a pair of ears 89 to which links 90 are attached. These links connect the wings to rock levers 91, pivoted to the front of the frame B. Pitmen 92 and levers 93 complete the connections between the wings 85, 86, and a cam disk 94, which is upon a short shaft 95 fixed in the frame B (see Figs. 1 and 2). Bevel gears 96 impart rotation to the cam 94 from the shaft 6. It will be seen that the wing operating mechanism lies close to the face of the frame piece B and consequently occupies but little space. As the timing of the wings must be slightly different, in order that the out turned hook on the blank shall be on the horn before the inturned hook is placed over it, each wing is operated by a separate cam groove, one being provided on each side of the cam disk 94. After the hooked edges of the blank are overlapped, and the horn expanded to interlock them, a hammer descends upon the seam pressing the same so as to form a tight secure joint.

*The hammer and anvil.*—The hammer, comprises a hardened steel bar 100, mounted in a coss head, 101, suitably supported for vertical reciprocation upon the frame B and operated from the shaft 6. 102, 102 indicate guide rods secured to the cross head near its ends and mounted in brackets 103 secured to the casting B. To the ends of the cross head are attached pitmen 104 connected to eccentrics 105 upon the shaft 6.

It is obvious that the lower limit of travel of the hammer must be varied according to the size of horn employed; and as the travel of the cross head is constant at all times, the change must be made in the hammer itself. Accordingly, hammers of different depths are employed with the different sized horns. These are detachably secured to the cross head and are readily interchanged. The continual hammering upon the horn would tend to more or less injure the same if means were not provided to relieve the strain thereon and it is for this purpose that the anvil is provided. This is raised up under the horn previous to the bending of the blank thereabout and consequently before each stroke of the hammer. The block 81 forms the head of the anvil and this is dovetailed into a frame 106, slidably mounted in ways upon the front of the frame member, B. The frame 106 rests upon a bracket 107, supported by the bed A and frame B of the machine. A suitable elevating device is interposed between said frame and supporting bracket, and means are provided for automatically operating the same at the proper times. The elevating device comprises a pair of plates 109 and 110, provided with a plurality of coacting inclined planes upon their adjacent faces, and means for moving them longitudinally in relation to each other. The block 109 is inserted in the bottom of the frame 106, and the block 110 is slidably mounted in the bracket 107. As the block 110 is moved to the left it raises the anvil as shown in Fig. XVI, while movement to the left allows the same to recede. A cam 112 upon the periphery of the cam disk 94 imparts reciprocation to the block 110 through rock levers 113. Set screws 114 in the upper ends of the levers 113 serve as means for adjusting the position of the block 110 in relation to the block 109. An adjustable wedge 115 beneath the block 110 serves to regulate the pressure of the anvil upon the bottom of the horn.

After the can body is formed about the horn, and the seam hammered, it is removed from the horn by an automatic push-off mechanism. This consists of a couple of bars suitably shouldered to engage the can body, and arranged to reciprocate at the proper time to eject the body from the machine.

116 indicates the push-off bars, and 117 the shoulders formed thereon to engage the can bodies. The forward ends of the bars 116 are contained in grooves 118 provided for them in the horn F, and are pivoted near their rear ends to a slide 119. The slide 119 is mounted upon a rod 120 extending between the frame member B and the spring carrying cross member 52, and, besides the push-off bars, carries also the horn expander 77. The horn expander and the push-off mechanism is adjustable for use with the various sizes of horns. Accordingly the bars 116 are not connected directly to the slide 119, but to blocks 121, which are adjustably secured to the angularly disposed arms 122 of the slide, and the expander is vertically adjustable on the central part of said slide. A spring 123 interposed between lugs 124 upon the tail ends of the bars 116 and lugs 125 upon the blocks 121, tend to throw the forward ends of the bars outwardly into position to engage the can body on the horn, and adjusting nuts 126 limit such outward movement. The rear end of the horn expander is turned down as at 127, forming a shoulder 128. The reduced part 127 enters a vertically disposed slot 129 in the slide 119, and a nut 130 clamps the slide firmly between it and the shoulder 128. It will be seen that when horns of different sizes are employed, the expanding rod and push-off bars may be adjusted to suit. The slide 119 is operated by the reciprocation of the cross head 101. To this end a bell-crank lever 131 is pivoted upon the frame B and one arm is connected to the cross head by link 132 and the other arm to the slide 119 by a pair of links 133. It will be seen that as the cross head ascends, after having hammered a seam, the slide 119, carrying the rod 77 and bars 116, is drawn forward permitting the horn to contract and ejecting the can body therefrom.

The various portions of the machine as described are so arranged in relation to each other, as to form a compact and stable machine as a whole. The shaft 6, from which all the parts are more or less directly driven, is arranged upon the front face of the frame member B, as near the base of the machine as is practicable. It will also be noted that all the heavy portions of the machine with the exception of the hammer and cross head are at or near the bottom of the machine. Between the shaft 6 and the frame is located the cam disk 94. This is arranged parallel with the face of the frame and with the shaft, and directly beneath the horn and wings, and consequently occupies but little space. Further, the various members connecting the cam disk with the parts it is designed to operate, lie close to and parallel with said frame. The edgers are supported on the opposite side of the member B, from the body forming mechanism, as are also its operating shaft 22 and its adjusting screw 35. In short, the machine comprises a vertically disposed frame member; an edging device arranged upon one side or face thereto and close thereof, with its operating mechanism arranged beneath it; a body forming mechanism arranged upon the opposite side or face of the vertical member and having its operating mechanism arranged directly below and above it; feed mechanism for feeding blanks to the edgers and body forming devices; and, a drive mechanism for the whole machine located near the base thereof.

The machine described is one of small size but of large capacity. That is, the parts thereof are so constructed and arranged that the machine, while of the maximum efficiency as to the number and quality of can bodies formed, occupies a minimum amount of space. It will be further seen, that the machine may be readily adjusted to form can-bodies of any size or shape and that it is as efficient in making can bodies of one shape or size as another.

The operation of the machine is as follows: It will be assumed that the clutch has been thrown in and that the various parts of the machine are in operation. Blanks are fed to the table in front of the push members, 48. As the blanks are thus placed upon the table, the guide bars 42' properly position them, as the distance between the bars 42' at their base is equal to the extreme width of the blanks. The reciprocation of the feed bars 46 carries the blanks forward to the edgers. Here the jaws 10 and 11 tightly clamp the ends of the blank, while the members 14 and 15 form hooks along the edges, forming the same on opposite sides of the blank, as and for the purpose hereinbefore described. The forward set of dogs 49 then shove the edged blank forward underneath the horn F. Here the spring clamp 80 holds the blank in position until the rotation of the cam disk 94 raises the anvil as before described, and clamps the blank firmly to the under side of the horn. Further rotation of the cam disk 94 causes the wings 85, 86 to fold the blank about the horn, lapping the inturned edge over the outturned one. During this part of the operation the slide 119 is in its forward position and the horn is contracted. The hammer 100 now descends to compress the seam. As it descends the slide 119 is moved rearwardly, carrying with it the rod 77. This expands the horn and tightly interlocks the overlapped edges, before the hammer 100 completes its downward stroke. As the edged blank is being carried forward to the horn, another blank is fed to the edgers, and the forming of one can body is simultaneous with the edging of the succeeding blank. As the hammer 100 rises the can body is pushed off of the horn, the horn contracts and the next edged blank fed in position to be formed about said horn. The formed can bodies may be pushed off upon a soldering machine, a conveyer, or into any suitable receptacle.

While the machine is running, three blanks are operated upon simultaneously. An edged blank is being shaped upon the horn, while another is being edged, and the third is in the feed machine preparatory to being fed to the edgers. As the seamed body is pushed off of the horn, the previously edged blank is fed thereto and another blank is delivered to the edger.

Having thus described our invention, we claim as new and desire to secure by Letters Patent:

1. In a machine of the class described, a suitable frame, in combination with a pair of edgers movably supported by said frame, a fixed table section on said frame, other table sections attached to said edgers and supported partially by said frame and partially by respective edgers, and means for simultaneously adjusting said edgers with relation to the frame and thereby varying the width of the table, substantially as described.

2. In a can-body making machine, a frame comprising an upright member and a suitably supported horizontal member, a pair of edgers movably supported on said upright member, a table comprising a plurality of longitudinally disposed members, including a central member or members resting upon and secured to said horizontal member and outer member rigidly secured to respective edgers and resting upon said horizontal member, means for varying the distance between said edgers and the table members, and springs, adjustable with said table members for pressing the blanks upon said table, substantially as described.

3. In a can-body making machine, a frame, a pair of edgers movably supported by said frame, a blank feeding table comprising a plurality of relatively adjustable members movable with said edgers, a plurality of pressure springs a bar supported above said table, and whereon said springs are adjustable with said table members, substantially as described.

4. In a machine of the class described, a frame in combination with a pair of edgers and a body forming mechanism, a blank feeding table comprising parallel horizontal members attached to and adjustable with said edgers, a plurality of spring devices adjustably supported above respective table members and adapted to press thereon, and a means for feeding blanks along said table, substantially as described.

5. In a machine of the class described, a body forming mechanism, a pair of edgers, a table comprising a plurality of parallel horizontal members extending longitudinally of the machine, means for adjusting the width of said table, a plurality of adjustable spring devices supported one above each table member and adapted to press thereon, and a feed mechanism for feeding blanks along said table, said feed mechanism comprising a pair of reciprocating bars mounted in grooves in said table members and provided with spring pressed dogs extending normally above the surface of the table to engage said blanks, and means for reciprocating said bars, substantially as described.

6. In a machine of the class described, a table comprising a plurality of parallel members adjustable toward or away from each other, grooves in two of said adjustable members, a reciprocating feed bar mounted in each said groove, a cross head and adjustable connections between said bars and said cross head, substantially as described.

7. In a machine of the class described, a table comprising a stationary middle member, and outer members parallel with and adjustable toward and away from said middle member, to vary the width of said table, in combination with reciprocating bars carrying blank feeding dogs and slidable in respective outer members, a cross head beneath said table members, blocks adjustably secured to said cross head and forming connections between said cross head and said bars, and means for reciprocating said cross head, substantially as described.

8. In a machine of the class described, a frame and a pair of edgers and a former horn mounted upon said frame, and a table, in combination with a feed mechanism comprising a pair of bars equipped with spring pressed dogs, and mounted for reciprocation in grooves in said table, a cross head, suitable connections between said cross head and said bars, a block slidably secured to the bottom of said cross head, means for adjusting said block upon said cross head, a rock shaft bracketed upon said frame, suitable connections between said rock shaft and said adjustable block, and means for rocking said shaft to operate said feed mechanism, substantially as described.

9. In a machine of the class described, a frame comprising an upright member and a suitably supported horizontal member, in combination with a pair of edgers, a former horn mounted upon said upright frame member, a grooved table supported above said horizontal member, a feed mechanism comprising bars equipped with spring pressed dogs, and mounted for reciprocation in the grooves of said table, a cross head mounted for reciprocation upon said horizontal frame member, and beneath said table, suitable connections between said cross head and said bars, a block slidably secured to the bottom of said cross head, means for adjusting said block upon said cross head, a rock shaft bracketed upon said frame, suitable connections between said rock shaft and said adjustable block, and means for rocking said shaft to operate said feed mechanism, substantially as described.

10. In a machine of the class described, a suitable frame, in combination with a pair of edgers movable on said frame, a right hand screw engaged with one of said edgers, a left hand screw engaged with the other edger and means for turning said screws simultaneously at one time and independently at another time to vary the distance between said edgers, as required by different blanks, substantially as described.

11. In a machine of the class described, a frame in combination with a body forming mechanism, comprising a former horn and wings, means for feeding edged blanks to said wings, a hammer-carrying cross head mounted on said frame, and a push-off mechanism operated by the reciprocation of said cross head for ejecting the can body from said horn, substantially as described.

12. In a machine of the class described, a frame in combination with a body forming mechanism, comprising an expansible horn and a pair of wings, means for feeding edged blanks to said mechanism, a hammer-carrying cross-head mounted on said frame, mechanism for expanding and contracting said horn, and a push off mechanism, both operated by the reciprocation of said cross head, substantially as described.

13. In a machine of the class described, a frame in combination with a can body forming mechanism comprising an expansible former horn and wings, a vertically reciprocative hammer-carrying cross-head mounted upon said frame, a horizontally reciprocative slide suitably located in relation to said horn, horn expanding mechanism and push off mechanism carried by said slide and suitable connections between said cross-head and said slide, whereby the reciprocation of the former will operate the latter, substantially as described.

14. In a machine of the class described, a frame, in combination with plate edgers adjustably arranged thereon and adapted to edge plates of different sizes, a former horn and coacting folding mechanism, a horn expander, push-off devices, a reciprocating cross head for actuating said expander and said devices and means adjustably securing said expander and devices to said cross head; adapting the same for use with different former horns, substantially as described.

15. A can body forming machine comprising a frame or plate, in combination with a former horn projecting from said frame, wings and an anvil co-acting with said horn, a bumper adapted to co-act with the top of the horn, means for actuating the bumper, a cam below the horn and operatively connected with said wings, a second cam interposed between said first mentioned cam and said wings and anvil, and means whereby said second cam is actuated from the first cam, substantially as described.

16. A can body forming machine comprising a frame or plate, in combination with a former horn projecting from said frame, wings and an anvil co-acting with said horn, a bumper adapted to co-act with the top of the horn, means for actuating the bumper, a cam below the horn and operatively connected with said wings, a second cam interposed between said first mentioned cam and said wings and anvil, and means whereby said second cam is actuated from the first cam and means for adjusting the operation of said second cam, substantially as described.

17. In a can body forming machine, a former horn, in combination with a vertical bar arranged beneath said horn, former wings pivoted on said bar, an anvil upon the upper end of said bar, means other than the bar for operating said wings, a multiple cam provided on the lower end of said bar, a coacting multiple cam movable horizontally beneath the end of said bar, means for regulating the movement of the co-acting cam and means for imparting movement thereto prior to the operation of said wings, substantially as described.

In testimony whereof, we have hereunto set our hands, this 29th day of September, 1906, in the presence of two subscribing witnesses.

VICTOR ODQUIST.
HALVOR HEYERDAHL LYCHE.

Witnesses:
CHARLES GILBERT HAWLEY,
A. W. NELSON.